United States Patent
Seetharaman et al.

(10) Patent No.: US 9,959,625 B2
(45) Date of Patent: May 1, 2018

(54) METHOD FOR FAST CAMERA POSE REFINEMENT FOR WIDE AREA MOTION IMAGERY

(71) Applicant: THE UNITED STATES OF AMERICA AS REPRESETNED BY THE SECRETARY OF THE AIR FORCE, Washington, DC (US)

(72) Inventors: Gunasekaran Seetharaman, Alexandria, VA (US); Kannappan Palaniappan, Columbia, MO (US); Hadi Ali Akbarpour, Columbia, MO (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 332 days.

(21) Appl. No.: 14/982,030

(22) Filed: Dec. 29, 2015

(65) Prior Publication Data

US 2017/0186164 A1   Jun. 29, 2017

(51) Int. Cl.
H04N 9/47 (2006.01)
G06T 7/00 (2017.01)
G06K 9/00 (2006.01)

(52) U.S. Cl.
CPC ........ G06T 7/0042 (2013.01); G06K 9/00208 (2013.01); *G06T 2207/30244* (2013.01)

(58) Field of Classification Search
CPC ........ G06T 7/0042; G06T 2207/30244; G06K 9/00208
See application file for complete search history.

(56) References Cited

U.S. PATENT DOCUMENTS

| | | | | |
|---|---|---|---|---|
| 5,559,695 A | * | 9/1996 | Daily | G01S 11/12 345/501 |
| 8,755,837 B2 | * | 6/2014 | Rhoads | G06F 17/30244 382/162 |
| 9,219,847 B2 | * | 12/2015 | Finnila | H04N 5/23225 |
| 9,286,678 B2 | * | 3/2016 | Zhu | G06T 7/0018 |
| 9,679,384 B2 | * | 6/2017 | Kurz | G06T 7/593 |
| 9,684,941 B2 | * | 6/2017 | Filler | G06T 1/0064 |
| 9,824,290 B2 | * | 11/2017 | Millin | G06T 3/4038 |
| 9,875,427 B2 | * | 1/2018 | Medasani | G06K 9/6218 |
| 2014/0043329 A1 | * | 2/2014 | Wang | G06T 17/20 345/420 |

* cited by examiner

*Primary Examiner* — Nhon Diep
(74) *Attorney, Agent, or Firm* — Joseph A. Mancini (57) ABSTRACT

The present invention provides a method for fast, robust and efficient BA pipeline (SfM) for wide area motion imagery (WAMI). The invention can, without applying direct outliers filtering (e.g. RANSAC) or re-estimation of the camera parameters (e.g. essential matrix estimation) efficiently refine noisy camera parameters in very short amounts of time. The method is highly robust owing to its adaptivity with the persistency factor of each track. The present invention highly suitable for sequential aerial imagery, particularly for WAMI, where camera parameters are available from onboard sensors.

12 Claims, 12 Drawing Sheets

| % | $N_2$ | RMS | | | Error in rotation | | | | Error in translation (meters) | | | |
|---|---|---|---|---|---|---|---|---|---|---|---|---|
| | | Non | Hub | Cauchy | BA+W | Non | Huber | Cauchy | BA+W | None | Huber | Cauchy | BA+W |
| 0 | 639312 | 4.3 | 1.6 | 0.020464 | 0.008168 | 0.0236 | 0.0502 | 0.0007 | 0.0008 | 251.99 | 235.68 | 2.95 | 0.96 |
| 5 | 672960 | 3.1 | 5.7 | 0.019825 | 0.001060 | 0.0528 | 0.0583 | 0.0008 | 0.0008 | 482.89 | 283.22 | 2.88 | 1.57 |
| 10 | 710346 | 11.5 | 4.7 | 0.037561 | 0.018892 | 0.0717 | 0.0656 | 0.0004 | 0.0005 | 467.98 | 406.01 | 5.00 | 2.82 |
| 15 | 752131 | 4.6 | 8.4 | 0.017211 | 0.016437 | 0.0987 | 0.1140 | 0.0004 | 0.0005 | 562.15 | 829.79 | 2.46 | 2.32 |
| 20 | 799140 | 5.6 | 8.2 | 0.017314 | 0.013681 | 0.1081 | 0.1727 | 0.0007 | 0.0006 | 673.17 | 1037.82 | 2.28 | 2.19 |
| 25 | 852416 | 4.5 | 5.6 | 0.009417 | 0.008742 | 0.0920 | 0.1258 | 0.0005 | 0.0004 | 523.95 | 752.53 | 1.71 | 1.30 |
| 30 | 913302 | 3.5 | 7.3 | 0.010823 | 0.014665 | 0.0740 | 0.1591 | 0.0002 | 0.0006 | 419.83 | 955.62 | 1.64 | 2.57 |
| 35 | 983356 | 4.5 | 8.3 | 0.011834 | 0.026774 | 0.0885 | 0.1792 | 0.0005 | 0.0008 | 528.86 | 1072.42 | 2.48 | 4.49 |
| 40 | 1065330 | 4.2 | 8.7 | 0.017740 | 0.016072 | 0.0853 | 0.1873 | 0.0005 | 0.0006 | 494.62 | 1120.38 | 2.91 | 2.74 |
| 45 | 1162385 | 3.9 | 8.5 | 0.015123 | 0.014296 | 0.0744 | 0.1850 | 0.0261 | 0.0007 | 450.31 | 1105.42 | 141.65 | 1.89 |
| 50 | 1278624 | 4.3 | 8.5 | 0.215706 | 0.013207 | 0.0782 | 0.1842 | 0.0596 | 0.0005 | 505.59 | 1100.55 | 339.00 | 1.78 |
| 60 | 1598280 | 3.1 | 8.5 | 0.019385 | 0.025161 | 0.0397 | 0.1859 | 0.0920 | 0.0006 | 371.29 | 1099.27 | 539.88 | 4.41 |
| 61 | 1639261 | 3.5 | 8.5 | 0.075541 | 0.050638 | 0.0489 | 0.1838 | 0.0933 | 0.0008 | 382.05 | 1095.84 | 546.77 | 5.60 |
| 62 | 1682400 | 4.3 | 9.2 | 0.013774 | 0.010368 | 0.0647 | 0.1966 | 0.0919 | 0.0006 | 461.22 | 1183.69 | 539.18 | 1.42 |
| 63 | 1727870 | 6.3 | 8.4 | 4.608076 | 3.107127 | 0.0509 | 0.1806 | 0.1039 | 0.0539 | 489.64 | 1083.30 | 617.03 | 284.82 |
| 64 | 1775866 | 4.1 | 8.5 | 4.482980 | 2.511354 | 0.0441 | 0.1837 | 0.1031 | 0.0632 | 437.36 | 1094.85 | 599.75 | 338.67 |
| 65 | 1826605 | 3.2 | 8.5 | 5.020343 | 3.739501 | 0.0491 | 0.1864 | 0.1142 | 0.0906 | 386.83 | 1104.14 | 669.83 | 502.22 |
| 70 | 2131040 | 18.8 | 7.9 | 5.530328 | 5.166041 | 0.0432 | 0.1742 | 0.1225 | 0.1205 | 696.56 | 1055.52 | 737.17 | 688.33 |

FIGURE 12

METHOD FOR FAST CAMERA POSE REFINEMENT FOR WIDE AREA MOTION IMAGERY

STATEMENT OF GOVERNMENT INTEREST

The invention described herein may be manufactured and used by or for the Government for governmental purposes without the payment of any royalty thereon.

BACKGROUND OF THE INVENTION

Bundle adjustment (BA) is an essential part of Structure from Motion (SfM) and Multi-View-Stereo (MVS) 3D reconstruction. In aerial photogrammetry and computer vision, it is essential to have the camera poses refined, in order to perform any further processing of the imagery data. BA is the most popular solution and a gold standard [1], [2] to obtain precise camera poses. It receives initial estimates of camera poses and minimizes the errors based on some cost functions [3]. Despite many reports presented in this old area of research, BA is still a bottleneck in related applications.

Mostly, initial camera poses (inputs to BA) are obtained through applying a RANSAC-based model estimation algorithm (e.g. Five-Point algorithm [4]-[6]). However, nowadays in aerial imagery systems, these parameters are often available and known as a priori which can be directly measured with on-board sensors (GPS and IMU). Nevertheless, these parameters are too noisy [7] and must be refined before being used in the downstream processing stages (e.g. 3D reconstruction)

Wherever the term 'BA pipeline' is used herein it refers to an end-to-end BA system (or SfM) whose inputs are raw images and outputs are refined camera poses and 3D point cloud. Likewise, when the term 'BA' is used it will refer to just the optimization stage where initial camera poses and point cloud are already available.

In the computer vision community, camera parameters are known as intrinsic and extrinsic. In photogrammetry, the same parameters are known as interior and exterior parameters. Having precise values of these parameters are very crucial for relevant applications (e.g. 3D reconstruction). BA is considered as the gold standard for refinement [1], [2], [11] of camera parameters. It is a classical and well-studied problem in computer vision and photogrammetry dating back more than three decades [3], [11]. A comprehensive introduction to BA can be found in [3] which covers a wide spectrum of topics involved in BA. Due to recent interest in large scale 3D reconstruction from consumer photos as well as aerial imagery there have been renewed interests in making BA robust, stable and accurate [5], [12]-[15]. Recently, several BA methods have been proposed, such as Sparse BA [16], [17], incremental BA [8] and Parallel BA [18], [19]. Several methods of BA have been compared in [13] while proposing some new methods which lead to better BA in terms of computation and convergence.

There have been many reports presenting the use of GPS and IMU measurements for refining camera parameters. However, to the best of knowledge, so far such measurements have been mostly used as complementary values and just together with other pose estimation methods through essential matrix estimation (in computer vision) [8], [9] or resectioning in photogrammetry. E.g., in [8], [9], [20], [21], available GPS and IMU measurement are fused with SfM approach using Extended Kalman Filter (EKF) or/and as extra constraints in BA. A SfM method, called Mavmap, is proposed in [10] which leverages the temporal consistency of aerial images and availability of metadata to speed up the performance and robustness. In [10], VisualSFM [18] has been considered as the most advanced and publicly available system for automated and efficient 3D reconstruction from images. However, as stated in [10], it has no integration of IMU priors.

OBJECTS AND SUMMARY OF THE INVENTION

The present invention relates generally to a novel BA pipeline to refine noisy camera parameters available from platform sensors. In the present invention, approximate sensor measurements are directly used as initial values for BA. Moreover the invention does not require the application of any early-stage filtering method (e.g. no RANSAC nor its variations) to eliminate outliers.

It is an object of the present invention to provide a method for camera pose refinement where approximate cameral parameters from low precision sensors can be used as initialization values in structure from motion 3D reconstruction.

It is another object of the present invention to provide a method for camera pose refinement where putative matches obtained from a sequential matching paradigm can be used as observation and initial 3D points.

It is yet another object of the present invention to provide a method for accurate or camera pose refinement where approximate and noisy camera parameters and unfiltered putative matches are directly fed into the process.

It is yet still another object of the present invention to provide a method for camera pose refinement that adapts to the occurrence of outliers using statistics extracted from feature tracks.

In an embodiment of the present invention, a method for camera pose refinement in three dimensional reconstruction of sequential frames of imagery of an image, comprises the steps of acquiring camera metadata, where the metadata comprises camera position metadata and camera orientation metadata; extracting interest points from each image frame in the sequence; comparing descriptors of the extracted interest points for each two successive image frames; matching the descriptors so as to generate feature tracks; generating a persistency factor for each feature track as a function of the feature track's length; computing a set of statistics for all of the persistency factors when all feature tracks have been generated; computing a triangulation based on the camera metadata and the feature tracks so as to generate estimated initial 3D interest points of the image; weighting residuals generated from back projection error using the persistency factors; computing an error function incorporating the weighted residuals, so as to reduce the effect of outlier noise; and computing a bundle adjustment incorporating to the weighted residuals and the camera metadata, so as to optimize the camera pose refinement and the estimated initial 3D interest points.

In another embodiment of the present invention as an article of manufacture, the invention comprises a non-transitory storage medium and a plurality of programming instructions stored therein, wherein the programming instructions are configured to implement the aforesaid actions upon a camera system for three dimensional image reconstruction.

In yet another embodiment of the present invention as a system for vehicle-based three-dimensional imagery reconstruction, the invention comprises an orientable camera system with at least one camera for producing sequential frames of imagery of an image; at least one vehicle system having geolocation subsystems and at least one orientable camera system part thereof; and a computer system being specifically configured by computer programming instructions so as to communicate with the geolocation subsystems and the camera systems to extract geolocation data from the geolocation subsystem and extract orientation and position data from the camera system and compute a refined camera pose based on the geolocation, orientation, and position data so as to produce a three-dimensional imagery reconstruction.

Briefly stated, the present invention provides a method for fast, robust and efficient BA pipeline (SfM) for wide area motion imagery (WAMI). The invention can, without applying direct outliers filtering (e.g. RANSAC) or re-estimation of the camera parameters (e.g. essential matrix estimation) efficiently refine noisy camera parameters in very short amounts of time. The method is highly robust owing to its adaptivity with the persistency factor of each track. The present invention is highly suitable for sequential aerial imagery, particularly for WAMI, where camera parameters are available from onboard sensors. However, the present invention is not limited to aerial photogrammetry or aircraft-type host vehicles but could include adaptation to terrestrial vehicles, watercraft and spacecraft. The invention typically comprises camera systems, a computer processor having software instructions for facilitating communications between the camera systems and the host vehicle's inertial navigation and global positioning systems and for processing and for refining camera position and orientation data through the computation of algorithms therein.

The above and other objects, features and advantages of the present invention will become apparent from the following description read in conjunction with the accompanying drawings, in which like reference numerals designate the same elements.

REFERENCES

[1] H. Stewenius, C. Engels, and D. Nistér, "Recent developments on direct PRS Journal of Photogrammetry and Remote Sensing, vol. 60, no. 4, pp. 284-294, 2006. 1, 2

[2] R. E. McGlone, J. C., Mikhail, E. M., Bethel, J., Mullen, Manual of Photogrammetry, fifth ed. American Society of Photogrammetry and Remote Sensing, 2004. 1, 2

[3] B. Triggs, P. McLauchlan, R. Hartley, and A. Fitzgibbon, "Bundle adjustment D a modern synthesis," in Vision Algorithms: Theory and Practice (W. Triggs, A. Zisserman, and R. Szeliski Eds.), 2000, pp. 298-372. 1, 2, 3, 4

[4] D. Nistér, "An efficient solution to the five-point relative pose problem," IEEE Transactions on Pattern Analysis and Machine Intelligence, vol. 26, no. 6, pp. 756-770, 2004. 1, 4

[5] V. Indelman, R. Roberts, C. Beall, and F. Dellaert, "Incremental Light Bundle Adjustment," in British Machine Vision Conference (BMVC), 2012, pp. 134.1-134.11. 1, 2

[6] S. Agarwal, Y. Furukawa, and N. Snavely, "Building {R}ome in a Day," Communications of the ACM, vol. 54, pp. 105-112, 2011. 1

[7] E. Rupnik, F. Nex, I. Toschi, and F. Remondino, "Aerial multi-camera systems: Accuracy and block triangulation issues," ISPRS Journal of Photogrammetry and Remote Sensing, vol, 101, pp. 233-246, March 2015. 1

[8] M. Lhuillier, "Incremental fusion of structure-from-motion and GPS using constrained bundle adjustments," IEEE Transactions on Pattern Analysis and Machine Intelligence, vol. 34, no. 12, pp. 2489-2495, 2012. 1, 2

[9] J.-M. Frahm, M. Pollefeys, S. Lazebnik, D. Gallup, B. Clipp, R. Raguram, C. Wu, C. Zach, and T. Johnson, "Fast robust large-scale mapping from video and internet photo collections," ISPRS Journal of Photogrammetry and Remote Sensing, vol. 65, no. 6, pp. 538-549, November 2010. 1, 2

[10] J.-M. Schonberger, Johannes L.; Fraundorfer, Friedrich; Frahm, "Structure-from-Motion For May Image Sequence Analysis With Photogrammetric Applications," International Archives of the Photogrammetry, Remote Sensing, vol. 40-3, p. 305, 2014. 1, 2, 4

[11] R. Hartley and A. Zisserman, Multiple View Geometry in Computer Vision, 2nd ed. Cambridge University Press, 2004. 2, 3

[12] S. Agarwal, N. Snavely, S. M. Seitz, and R. Szeliski, "Bundle adjustment in the large," in European Conference Computer Vision (ECCV), 2013, pp. 29-42. 2

[13] Y. Jeong, S. Member, D. Niste, and I.-s. Kweon, "Pushing the Envelope of Modern Methods for Bundle Adjustment," IEEE Transactions on Pattern Analysis and Machine Intelligence, vol. 34, no. 8, pp. 1605-1617, 2012. 2

[14] D. J. Walvoord, A. Rossi, B. D. Paul, B. V. Brower, and M. F. Pellechia, "Geoaccurate three-dimensional reconstruction via image-based geometry," in SPIE Geospatial InfoFusion III, M. F. Pellechia, R. J. Sorensen, and K. Palaniappan, Eds., vol. 8747, 2013. 2

[15] R. Lakemond, C. Fookes, and S. Sridharan, "Resection-Intersection Bundle Adjustment Revisited," ISRN Machine Vision, vol. 2013, pp. 1-8, 2013. 2

[16] M. Lourakis and A. Argyros, "SBA: A software package for sparse bundle adjustment," ACM Transactions oil Mathematical Software, vol. 36, no. 1, p. 30, 2009. 2

[17] K. Konolige, "Sparse Bundle Adjustment," Proceedings of the British Machine Vision Conference 2010, pp. 102.1-102.11, 2010. 2

[18] C. Wu, S. Agarwal, B. Curless, and S. M. Seitz, "Multicore Bundle Adjustment," in CVPR, no. 1, 2011. 2, 4

[19] C. Wu, "Towards Linear-Time Incremental Structure from Motion," 2013 International Conference on 3D Vision, pp. 127-134, June 2013. 2

[20] M. Pollefeys, D. Nister, J.-M. Frahm, A. Akbarzadeh, P. Mordohai, B. Clipp, C. Engels, D. Gallup, S.-J. Kim, P. Merrell, C. Salmi, S. Sinha, B. Talton, L. Wang, Q. Yang, H. Stewénius, R. Yang, G. Welch, and H. Towles, "Detailed Real-Time Urban 3D Reconstruction from Video," International Journal of Computer Vision, vol. 78, no. 2-3, pp. 143-167, October 2007. 2

[21] M. Bryson, A. Reid, F. Ramos, and S. Sukkarieh, "Airborne vision-based mapping and classification of large farmland environments," Journal of Field Robotics, vol. 27, no. 5, pp. 632-655, May 2010. 2

[22] A. Albarelli, E. Rodola, and A. Torsello, "Imposing semi-local geometric constraints for accurate correspondences selection in structure from motion: A game-theoretic perspective," International Journal Computer Vision, vol. 97, pp. 36-53, 2012. 2

[23] A. Aravkin, M. Styer, Z. Moratto, A. Nefian, and M. Broxton, "Student's t robust bundle adjustment algorithm," in Proceedings—International Conference on Image Processing, ICIP, 2012, pp. 1757-1760. 2, 4

[24] S. Niko and P. Protzel, "Towards Using Sparse Bundle Adjustment for Robust Stereo Odometry in Outdoor Terrain," in TARO, vol. 2, 2006, pp. 206-213. 2

[25] C. Wu, "SiftGPU: A GPU implementation of Scale Invaraint Feature Transform (SIFT)," 2007. [Online]. Available: http://cs.unc.edu/~ccwu/siftgpu 3
[26] S. Agarwal, K. Mierle, and Others, "Ceres solver," http://ceres-solver.org. 3 [27] Y. Furukawa and J. Ponce, "Accurate, dense, and robust multiview stereopsis," *IEEE transactions on pattern analysis and machine intelligence*, vol. 32, no, 8, pp. 1362-76, August 2010. 3
[28] D. Huynh, "Metrics for 3D rotations, Comparison and analysis," *Journal of Mathematical Imaging and Vision*, vol. 35, no. 2, pp. 155-164, 2009. 5

BRIEF DESCRIPTION OF THE DRAWINGS

FIG. 12 depicts the present invention's performance of optimization in the presence of different levels of outliers.

DESCRIPTION OF THE PREFERRED EMBODIMENT

Figure 1:
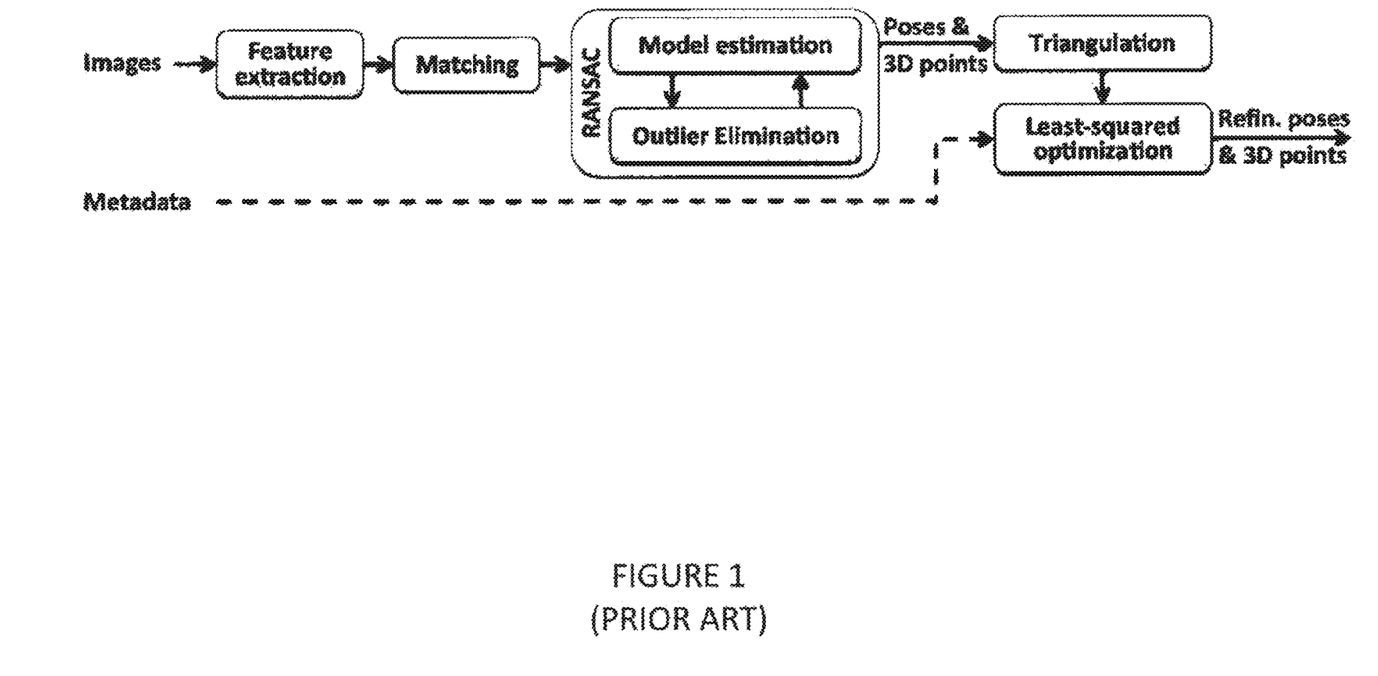
FIG. 1 depicts a conventional prior art SfM where camera poses and outliers are simultaneously estimated using RANSAC. Metadata sometimes is used as extra constraint in optimization.

This describes the apparatus and method for fast, robust and efficient BA pipeline (SfM) for wide area motion imagery (WAMI). Referring to FIG. 1, the process flow for a conventional SfM is depicted where Camera poses and outliers are simultaneously estimated using RANSAC. Metadata sometimes is used as extra constraint in optimization.

Figure 2:
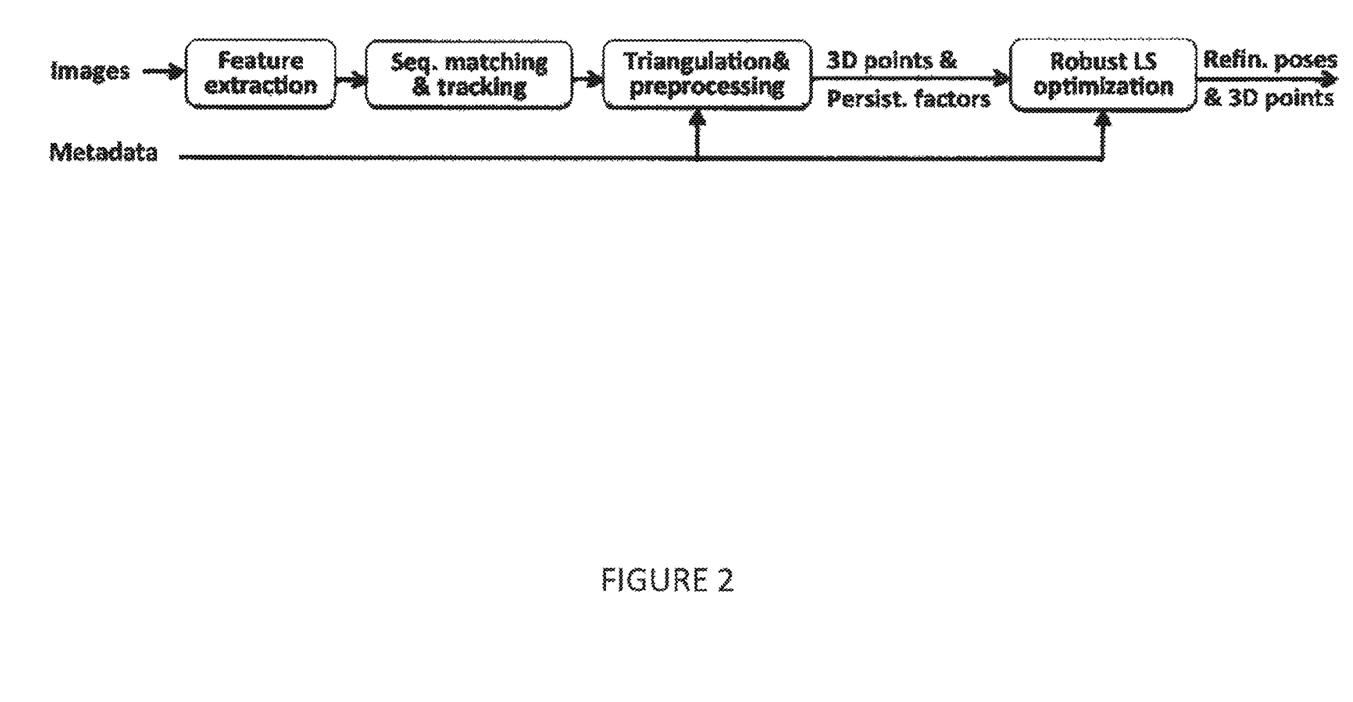
FIG. 2 depicts the present invention's pipeline SfM where metadata is directly used without model estimation or explicit outlier elimination nor RANSAC.

Referring to FIG. 2 depicts the process flow for the present invention's BA pipeline (SfM) where metadata is directly used without model estimation, explicit outlier elimination nor RANSAC. More precisely, contributions of the present invention include:

The utilization of approximate camera parameters available from low precision sensors in an airborne platform (particularly in Wide Area Motion Imagery-WAMI) in a BA as initial values (and not as extra constrains [8]-[10]), provided that a proper robust function is used. A benefit of the present invention is that there is no need to apply any camera pose estimation method (e.g. Five-Point algorithm [4], [7], [10]). Nor is it necessary to apply a filtering method such as EKF [8], [9] before feeding noisy sensor measurements into the optimization engine.

Putative matches obtained from a sequential matching paradigm can be directly used as observation and initial 3D points in the BA. In the present invention there is no need to eliminate outliers before feeding the putative matches to the optimization engine. For instance, it is not necessary in the present invention to use RANSAC or any other explicit outlier filtering mechanism.

In the present invention, despite its (1) direct feeding of approximate-noisy camera parameters obtained from low accuracy onboard GPS and IMU sensors and (2) use of all putative matches with no filtering, a BA optimization engine can efficiently refine the camera parameters, provided that a proper robust function is used.

The present invention introduces an adaptive robust function to deal with outliers within the optimization stage. Each individual residual is weighted based on statistics extracted from the feature tracks. The invention's robust function has been compared to some other well-known robust functions such as Cauchy and Huber [3].

Building Feature Tracks

In persistent aerial imagery (WAMI), flights have continuous circular trajectories, yielding temporal consistency to the image sequence. By leveraging the temporal consistency of the images and using them as a prior information the present invention reduces the time complexity of matching from $O(n_c^2)$ to $O(n_c)$, while not compromising the quality of pose refinement results. This is similar to what has been recently proposed in [10]. In the present invention, interest points are extracted from each image using a proper feature extraction method. Starting from the first frame, for each two successive image frames, the descriptors of their interest points are compared. While successively matching them along the sequence, a set of feature tracks are generated. A track indicates that a potentially unique 3D point in the scene has been observed in a set of image frames. The minimum length for a track is two and it ideally can go up to $N_c$ (number of cameras). Normally the tracks are just used as a way to associate a set of features points together from which a 3D point is estimated in the scene. In this work, additionally, the invention considers the length of a track j as a factor (or indication) of persistency, $\gamma_j$, and use it in the optimization. Indeed $\gamma_j$ is a measure of the persistent, temporal co-visibility of jth 3D point (track) in an image sequence. The intuition is that a detected feature point is more reliable if it can be detected over a longer period of time over successive frames in a sequence. It is analogue to say that a 3D point estimated from a shorter track is more vulnerable to be a spurious point, which can adversely affect the optimization. Therefore with each track of features a persistency factor is assigned and stored. After building all tracks, the expected value of all the persistency factory $$\mu = \frac{1}{N_{3D}} \sum_{j=1}^{N_{3D}} \gamma_j$$

and their standard deviation (std), $\sigma$, are calculated. These two statistical factors will be used together with the persistency factors, $\gamma_j(j=1 \ldots N_{3D})$, within the optimization stage.

Robust Pose Refinement

BA Formulation

BA refers to the problem of jointly refining camera parameters and 3D structure in an optimal manner. Given a set of $N_c$ cameras, with possibly different poses (translations, orientations) and $N_{3D}$ points, the BA is done by minimizing the sum of squared reprojection errors:

$$\min_{R_i, t_i, X_j} \sum_{i=1}^{N_c} \sum_{j=1}^{N_{3D}} \|x_{ji} - g(X_j, R_i, t_i, K_i)\|^2 \quad (1)$$

where $R_i$, $t_i$, $K_i$ are respectively the rotation matrix, translation vector and calibration matrix of $i^{th}$ camera, $X_j$ is a 3D point from the structure and is the image coordinates (observation) of $X_j$ in camera i. Here $g(X_j;R_i; t_i;K_i)$ is a projection model which maps a 3D point $X_j$ onto the image plane of camera i using its related extrinsic ($R_i$ and $t_i$) and intrinsic parameters ($K_i$) and is defined as:

$$g(X_j, R_i, t_i, K_i) \sim P_i X_j \quad (2)$$

where $P_i$ denotes projection matrix of camera i and defined as $P_i = K_i[R_i|t_i]$. Usually $g(X_j; R_i; t_i;K_i) = x_{ji}$ is not satisfied due to noisy parameters and a statistically optimal estimate for the camera matrices $P_i$ and 3D points $X_j$ is desired. This $L_2$ minimization of the reprojection error involves adjusting the bundle of rays between each camera center and the set of 3D points which is a non-linear constrained optimization problem. Note that the above minimization is equivalent to finding a Maximum Likelihood (ML) solution assuming that the measurement noise is Gaussian and we refer to [3], [11] for more details. There exists various methods to solve the above non-linear least squares problem. Implicit trust region methods and in particular Levenberg-Marquardt (LM) methods are well-known in the BA literature [13], [16].

Adaptive Robustifier

Automatic selection of 2D point correspondences (tie points) is arguably known as one of the most critical steps in image based multi-view reconstruction [22]. Feature correspondences are usually contaminated by outliers, that is wrong data association. Mostly, pose refinement or SfM techniques in literature, use initial estimates and then perform a refinement which generally happens by iteratively applying LM algorithm [3] on the initial camera parameters and 3D points. LM is highly sensitive to the presence of outliers in the input data [22]. Mismatches can cause problems for the standard least squares approach and as stressed in [23] even a single mismatch can affect the entire result. Mismatches can easily lead to sub-optimal parameter estimation or, even in the worst cases, to the inability of the optimization algorithm to obtain a feasible solution [22], [24]. This is even more problematic for high resolution WAMI where potential correspondences are enormous. Generally the mismatches are explicitly excluded from the putative matches in very early stages and much before applying an optimization. For example, in computer vision, a SfM algorithm is applied in which simultaneously initial camera parameters are estimated while explicitly detecting and eliminating outliers (which happens mostly through different variations of RANSAC). Here, in the present invention, there is no need to apply any explicit outlier elimination algorithm (RANSAC or any). The choice of a proper robust function is very crucial to achieve robustness in the optimization when the initial parameters are too noisy and outliers were not explicitly eliminated. It was previously noted that a feature persistently observed in successive frames along the airplane trajectory is less likely to produce a spurious 3D point. Inspired from Cauchy robust function [3], the present invention integrates this theory by using the statistics calculated in the feature-tracking stage:

$$\rho_j(s_j, \gamma_j, \mu, \sigma) = \left(\frac{\gamma_j}{\mu+\sigma}\right)^2 \log\left(1 + \left(\frac{\mu+\sigma}{\gamma_j}\right)^2 s_j^2\right) \quad (3)$$

where $s_j$ denotes the residual of jth 3D point, $\gamma_j$ stands for its persistency factor, and $\mu$ and $\sigma$ are respectively the mean and std of persistency factors of the whole track population. For each individual residual, its persistency factor is normalized by being divided to the sum of mean and std of the population, and the result is used as a weight in the robust function. A larger persistency factor for a track is seen analogue to a longer life period over the image sequence (higher persistency on their continuous observation over the trajectory). Residuals belonging to a track with a longer life period (larger $\gamma_j$) are favored over residuals with shorter life period (smaller $\gamma_j$). Plugging (3) into (1) yields:

$$\min_{R_i, t_i, X_j} \sum_{i=1}^{N_c} \sum_{j=1}^{N_{3D}} \left(\frac{\gamma_j}{\mu+\sigma}\right)^2 \log\left(1 + \left(\frac{\mu+\sigma}{\gamma_j}\right)^2 \|x_{ji} - g(X_j, R_i, t_i, K_i)\|^2\right) \quad (4)$$

Experiments

Figure 3:
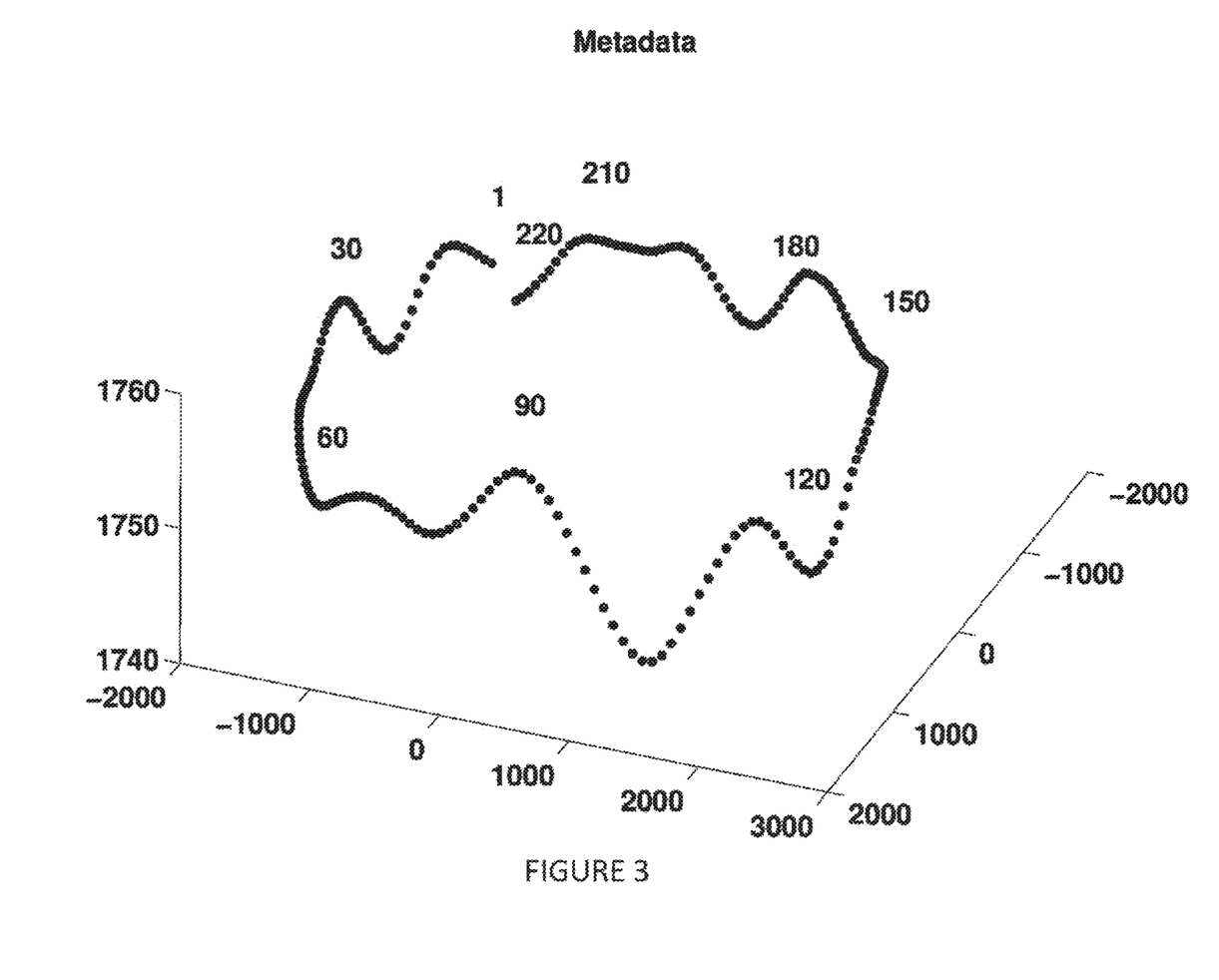
FIG. 3 depicts a camera trajectory for a Berkley dataset for left positions.
Figure 4:
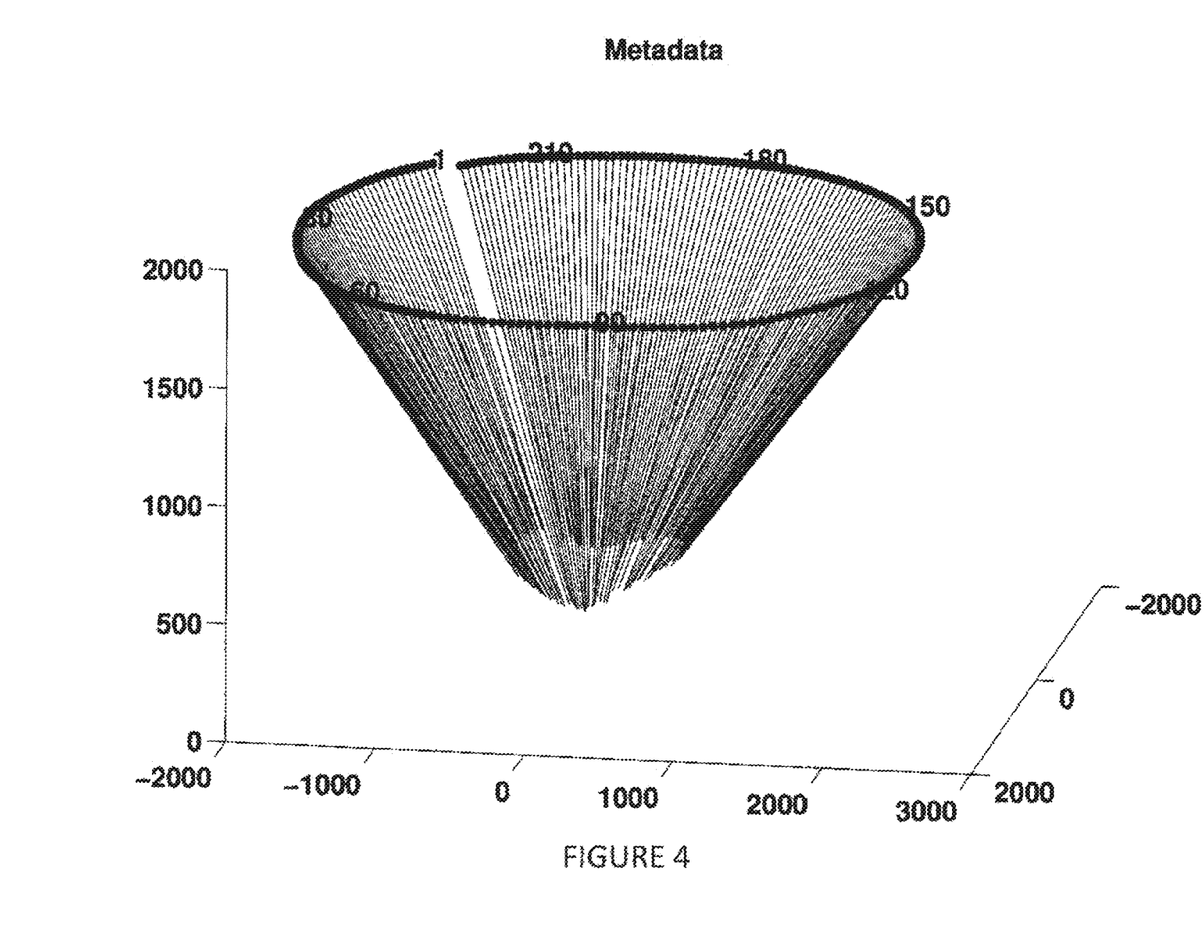
FIG. 4 depicts a camera trajectory for a Berkeley dataset for right looking directions.
Figure 5:
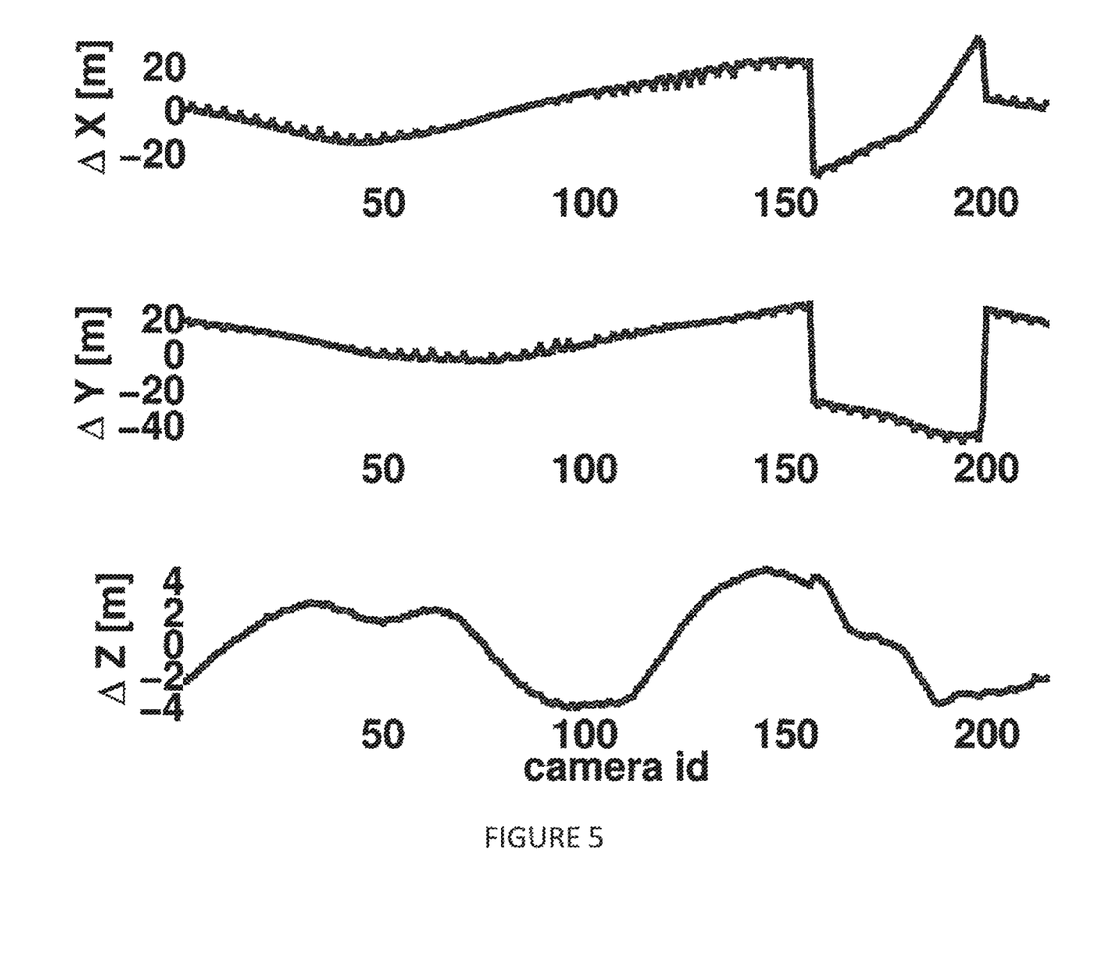
FIG. 5 depicts the difference between camera positions of metadata and the present invention's output, i.e., a measure of the camera position's correction for an Albuquerque location.
Figure 6:
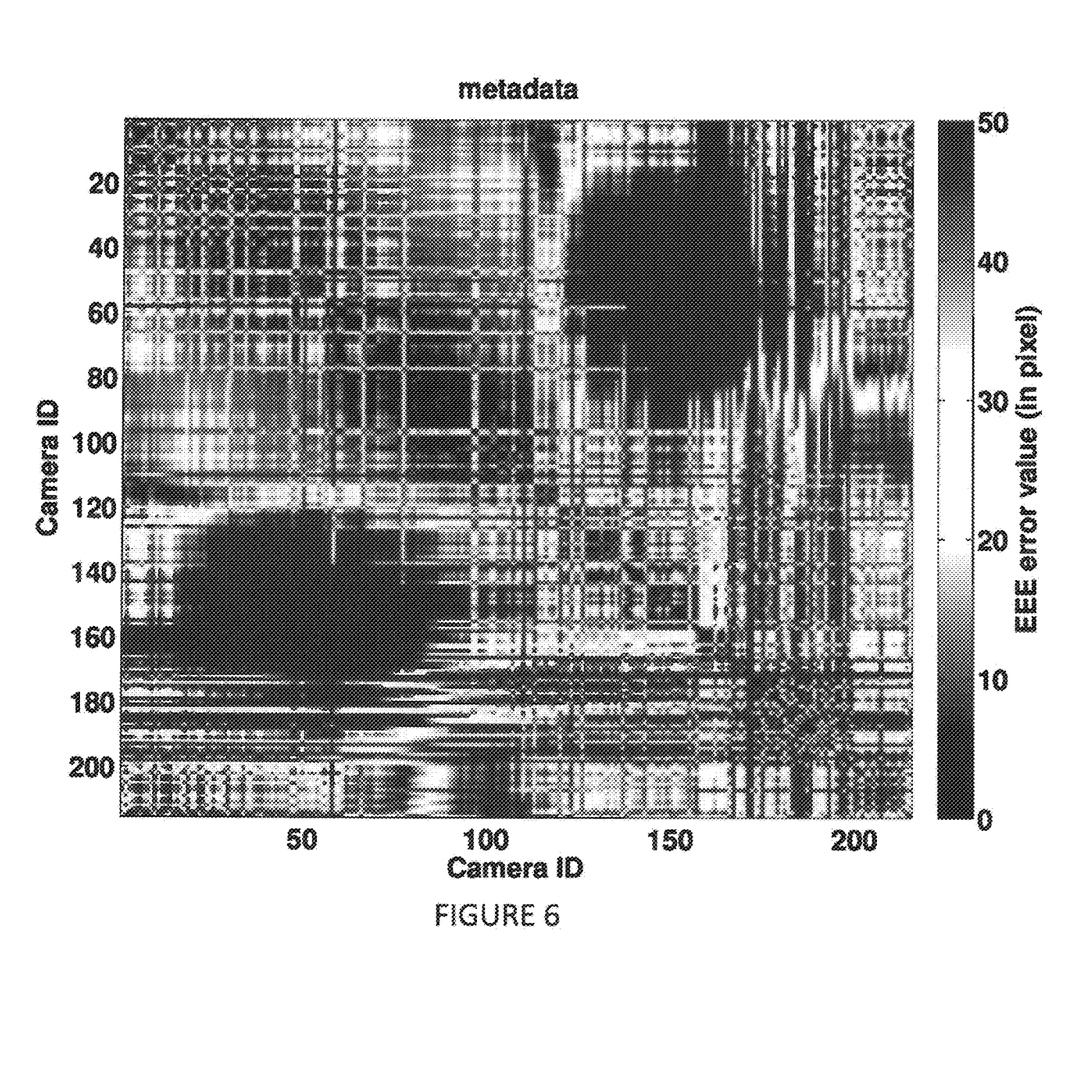
FIG. 6 depicts the difference between camera positions of metadata and the present invention's output, i.e., a measure of the camera position's correction for a Berkeley location.

BA4W pipeline has been implemented in C++. The used PC has the following specification: CPU Intel Xeon 5650, 2.66 GHz, 12 cores (24 threads), 24 GB RAM and nVidia GTX480/1.5 GB as the GPU. SIFT-GPU [25] has been used for fast feature extraction. The present invention uses Ceres Solver library [26] as a framework for non-linear least-squares estimation. Schur's complement, Cholesky factorization and Levenberg-Marquardt algorithm were used for trust region step computation. The WAMI datasets (see FIG. 9) were collected from platform sensors of an airplane flying over different areas in the USA including Albuquerque downtown, Four hills (Albuquerque), Los Angeles, Berkeley and Columbia. In addition to the images, camera orientation matrices and translation vectors were measured by IMU and GPS sensors (referred as metadata). The BA4W pipeline has been run on each dataset. A non-linear triangulation algorithm [11] was used to estimate and initialize 3D points. Also, persistency factors of the tracks and their related statistics were computed and the outputs were used as inputs to the adaptive robust function in the optimization. The camera positions and their looking directions (i.e., orientation) corresponding to the Berkeley dataset are plotted in FIG. 3 and FIG. 4 for left positions and right looking directions, respectively. FIG. 5 and FIG. 6 depict the amount of corrections accomplished by BA4W on the camera positions for Albuquerque and Berkeley locations, respectively. As one can see, in Albuquerque, (see FIG. 5) the correction value for one of the axes (Y) is about 40 meters which indicates how noisy the metadata were for this dataset. The highest error value (about 40 m) happens at frame 155. After probing the metadata we encountered a large and abrupt acceleration of 60 m/s² on this frame, significantly larger than other ones. This amount of noise could be mostly due to using low-precise sensors in the data acquisition platform.

Figure 7:
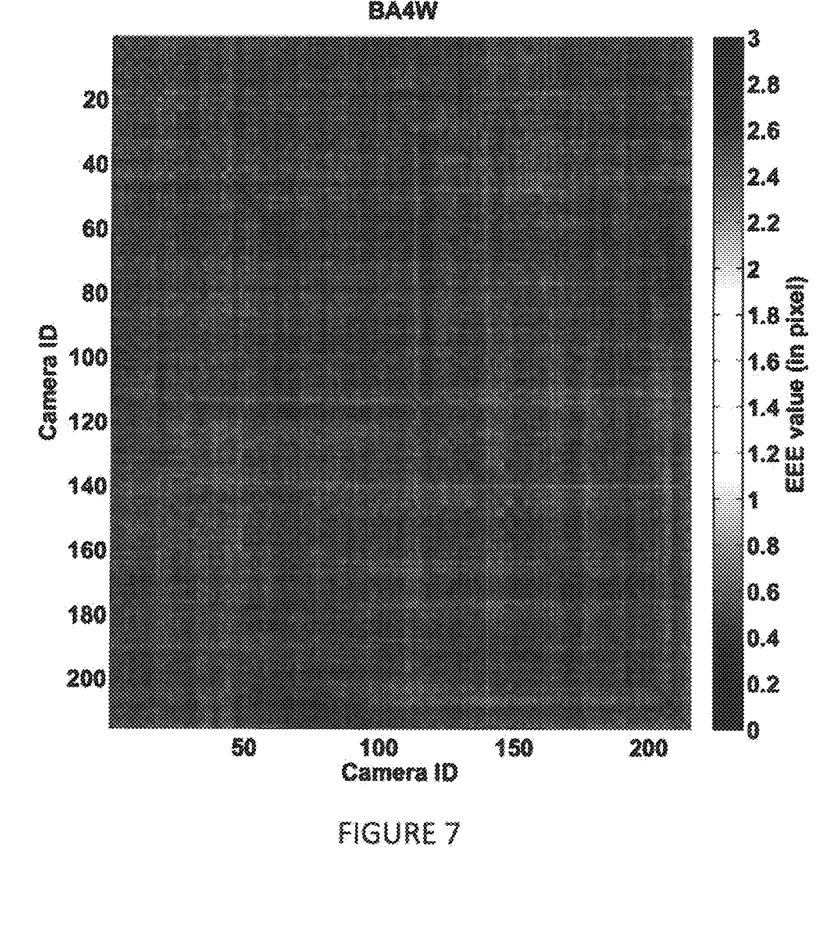
FIG. 7 depicts a representation of error values between each pair of cameras within a data set for an Albuquerque location for $(\mu_\epsilon, \sigma_\epsilon) = (39.57, 33.74)$.
Figure 8:
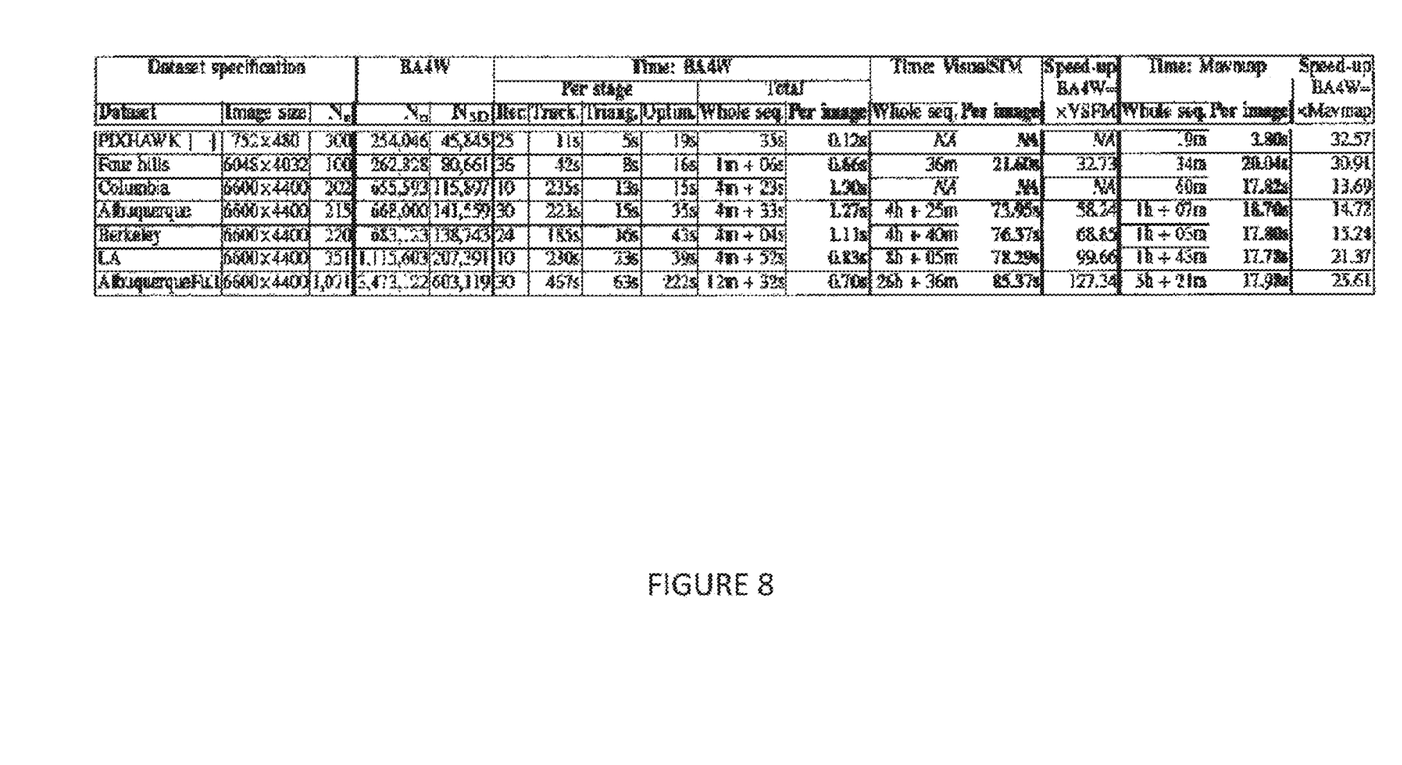
FIG. 8 depicts a representation of error values between each pair of cameras within a data set for an Albuquerque location for $(\mu_\epsilon, \sigma_\epsilon) = (0.47, 0.12)$.
Figure 9:
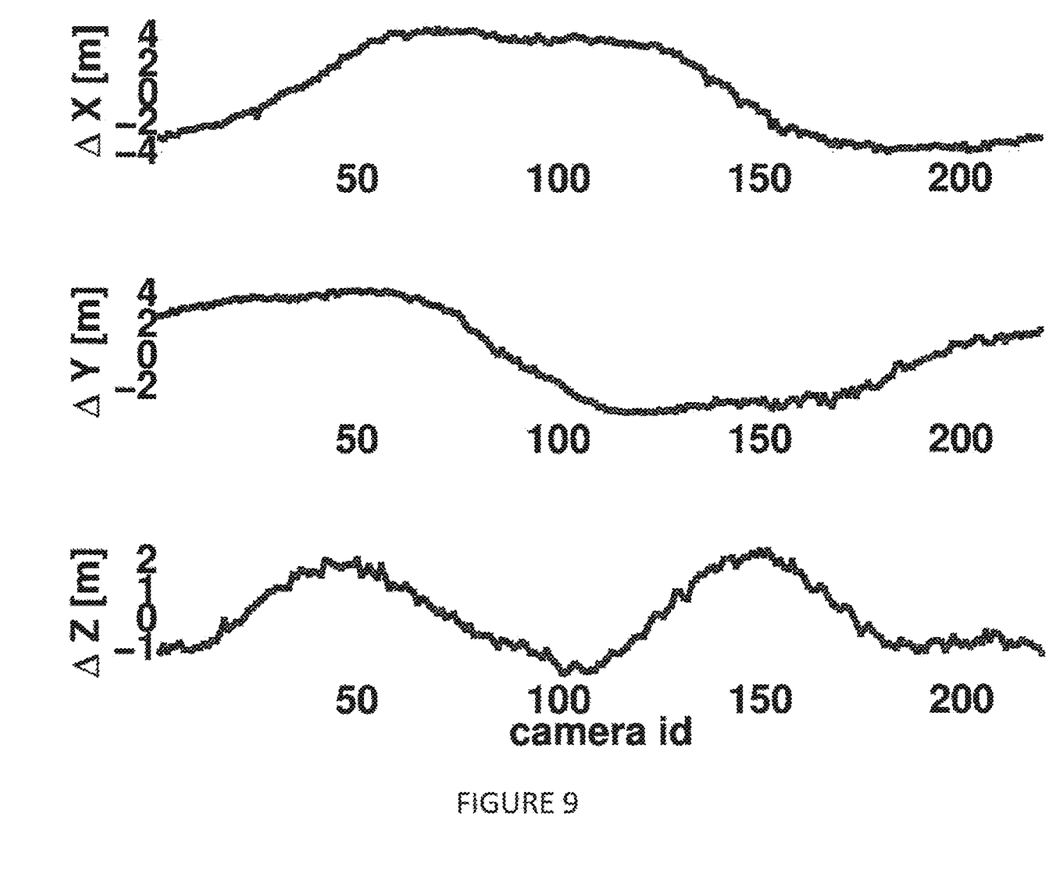
FIG. 9 depicts a comparison of the present invention's (BA4W) performance with that of competing prior art approaches VisulaSfM and Mav map.
Figure 10:
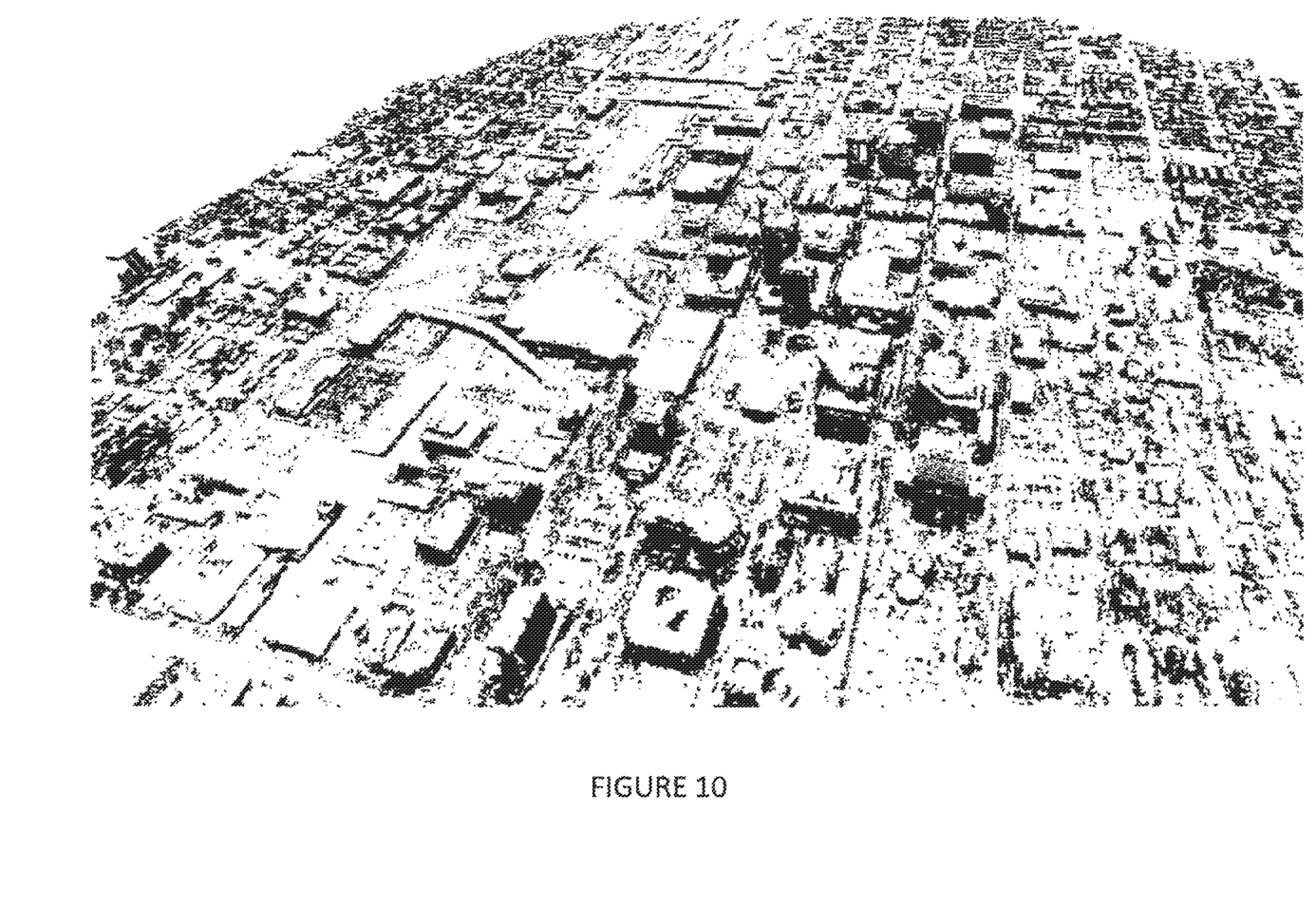
FIG. 10 depicts dense 3D point clouds obtained by the present invention of downtown Albuquerque.
Figure 11:
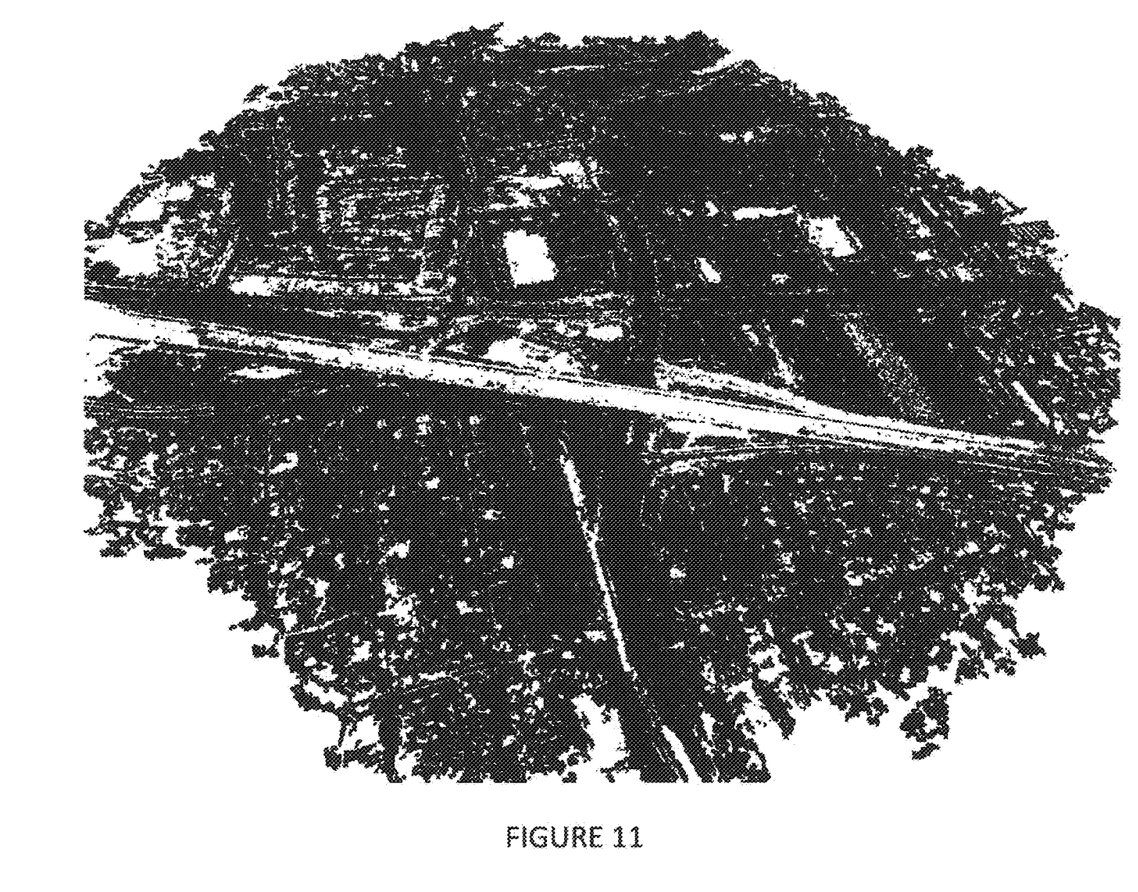
FIG. 11 depicts dense 3D point clouds obtained by the present invention of Four Hills, Albuquerque.

FIG. 7 and FIG. 8 represent the error values between each pair of cameras (a cell in the plot) within one of the datasets (Albuquerque), before and after BA for $(\mu_\epsilon,\sigma_\epsilon)$=(39.57, 33.74) and $(\mu_\epsilon,\sigma_\epsilon)$=(0.47,0.12), respectively. For each dataset a groundtruth has been generated by manually tracking a set of $N_g$ points over the image sequences. For each pair of cameras, i and j, their mutual pose error $\epsilon_{ij}$ is measured by:

$$\epsilon_{ij} = \frac{1}{N_g}\sum_{k=1}^{N_g} d(x_{kj}, F_{ij}, x_{ki}) \quad (5)$$

where $F_{ij}$ is the Fundamental matrix between the image planes of two cameras and directly computed from the camera pose parameters as:

$$F_{ij} \leftarrow K_j^{-T}R_iR_j^TK'_i\text{skew}(K_jR_jR_i^T(t_j-R_iR_j^Tt_i)) \quad (6)$$

and d is the Euclidean distance between a groundtruth point $x_{kj}$ (in image j) and its corresponding epipolar line $F_{ij} x_{ki}$ from image i. FIG. 7 and FIG. 8 present the $\epsilon_{ij}$ values plotted in different color spectrum. The left and right plots correspond to evaluation using original camera poses (from metadata) and bundle adjusted ones (by BA4W), respectively. The mean and std of all are computed and displayed under each case. As can be seen, BA4W has been quite successful in the pose refinement process despite of taking significantly short running time (see FIG. 9 for more details). Usually a dense 3D reconstruction algorithm such as PMVS [27] is applied after a BA, in order to obtain a dense and colored point cloud. In experiments with the present invention, PMVS was applied over some of the datasets. The optimized metadata (by BA4W) were used as inputs into the dense reconstruction algorithm. FIG. 10 and FIG. 11 represent the obtained dense point clouds for two of the datasets, Albuquerque (downtown) and Four Hills, respectively.

The present invention was compared to Mavmap [10] as a recent SfM algorithm for sequential aerial images. Likewise to the present invention, Mavmap also takes advantage of temporal consistency and availability of metadata. The camera poses in Mavmap are initialized by estimating the essential matrix [4] and applying a RANSAC technique to deal with large amounts of outliers. In addition to Mavmap, VisualSfM [18] as a state-of-the-art incremental SfM has been run on the datasets. VisualSFM was run in its sequential matching mode where each frame is matched just with its next frame. However, VisualSFM failed to generate reasonable results by producing several fragments of cameras and only a fraction of cameras could be recovered and for other cameras it failed. This observation about Visual SFM's performance on sequential aerial images is consistent with what was reported by [10]. Thereafter, VisualSFM was run in its exhaustive matching mode to get reasonable results. FIG. 9 shows the comparison results. In these experiments, the present invention is, on average, 77 times faster than VisualSfM, as a conventional SfM, and 22 times faster than Mavmap, as a state-of-the-art SfM for sequential aerial images. Over the longest WAMI dataset (AlbuquerqueFull), VisualSfM and Mavmap took about 85 and 18 seconds, respectively, whereas the present invention took just 0.7 second to process one frame in average.

Tolerability of BA4W in Presence of Outliers:

In SfM and camera pose refinement methods often RANSAC (or it variations) is used to simultaneously estimate the camera parameters and reject outliers. In conventional BA, just inliers are fed to the BA optimization in order to refine the camera parameters. Conventional BAs are normally very sensitive to outliers and even a single mismatch sometimes may affect all results [23]. In the present invention, the camera parameters are directly being used in the optimization without applying a RANSAC (or its variation) for model estimation. However, the other task of RANSAC is to deal with outliers. The present invention demonstrates that there will be no need to explicitly eliminate outliers in the beginning stages of a BA pipeline (SfM) and instead the outliers, even high percentage, can be treated within the optimization stage provided that a proper robust function is used.

Generally in the optimization problems, for situations where outliers are expected, a robust function may be used in order to mitigate the outlier's effect. Cauchy and Huber [3] are two of such robust functions. The present invention possesses a novel robust method which is adaptive with the persistency factor of the tracks. In the present invention, the behavior of its robust function is analyzed and compared with some other common ones, that is, more precisely, the tolerability of the present invention's approach in the presence of different amounts of outliers.

In order to evaluate the present invention's behavior in such situations, a set of synthetic data was generated from real data. First the present invention was run over the real Albuquerque dataset. Its outputs, including optimized 3D points and camera parameters, were taken and considered as the ground-truth. The image points (features or observations) from the real dataset are discarded for this experiment. However, in order to obtain groundtruth for image points (features), the optimized 3D points were projected back onto the 215 image planes using the optimized camera parameters. The obtained image points were used as observation after eliminating invalid ones (the ones which go off the image planes). This makes it possible to have a syntactic and accurate groundtruth, yet quite similar to a real scenario. Then, a percentage of outliers were added to each track. The observation values (image pixel coordinates) for outliers were generated randomly and inserted for randomly chosen cameras in each track. For example, if a track (3D point) includes 20 cameras (20 feature points in 20 images) and if the outlier percentage was set to 60%, then 30 random camera indices are generated and for each one a random observation (random image coordinates) is generated. The randomly generated image coordinates in randomly chosen camera indices are again randomly inserted somewhere along the track. Notice that the 20 original cameras such a track) together with injected 30 random cameras/observations yields to have totally 50 image observations where 60% of them are outliers. The contaminated observations (correct mage points and the outliers) were used together with the original metadata (initial noisy camera parameters from the original real dataset, not the optimized ones) as inputs to the BA optimization. Within the optimization, four different situations have been considered: (1) Not using any robust function, (2) using Huber robust function, (3) using Cauchy robust function and (4) using the present invention's robust function. Two metrics are used to evaluate each one's performance: RMS of reprojection errors and the differences between the recovered camera poses and their groundtruth. Translation errors are computed based on the following equation:

$$\frac{1}{N_c}\sum_{j=1}^{N}\|\tilde{t}_j - t_j\| \quad (7)$$

where $\|.\|$ defines the Euclidean norm, $\tilde{t}_j$ and $t_j$, respectively stand for the BA output and groundtruth related to jth camera. Norm of the difference/sum of the quaternions is used as rotation error [28]:

$$\frac{1}{N_c}\sum_{j=1}^{N}\min\{\|\tilde{q}_j - q_j\|, \|\tilde{q}_j + q_j\|\} \qquad (8)$$

where $\tilde{q}_j$ and $q_j$ are the quaternion representations for the BA output and groundtruth related to jth camera. The results are presented in FIG. 12. The errors with acceptable values are highlighted in yellow. As can be seen, the BA with no robust function or with Huber have the highest error values even when zero percent of data are contaminated. It means that just a high amount of noise in the camera parameters (inputs to the BA optimization; in this case the noise levels are indicated in FIG. 5) is enough to totally fail the optimization. The Cauchy robust function could optimize the camera parameters in the presence of outliers until 40%. However, the present invention's robust function could optimize the camera parameters in the presence of up to 62% of outliers. It is worth mentioning that just RMS of reprojection errors may not be informative enough and one should evaluate extrinsic parameters too, as can be seen from this figure.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for camera pose refinement in three dimensional reconstruction of sequential frames of imagery of an image, comprising the steps of:
    acquiring camera metadata, said metadata comprising camera position metadata and camera orientation metadata;
    extracting interest points from each said image frame in said sequence;
    comparing descriptors of said extracted interest points for each two successive image frames;
    matching said descriptors so as to generate feature tracks;
    generating a persistency factor for each said feature track as a function of said feature track's length;
    computing a set of statistics for all said persistency factors when all feature tracks have been generated;
    computing a triangulation based on said camera metadata and said feature tracks so as to generate estimated initial 3D interest points of said image;
    weighting residuals generated from back projection error using said persistency factors;
    computing an error function incorporating said weighted residuals, so as to reduce the effect of outlier noise; and
    computing a bundle adjustment incorporating said weighted residuals and said camera metadata, so as to optimize said camera pose refinement and said estimated initial 3D interest points.

2. The method of claim 1, wherein said set of statistics further comprises mean and standard deviation.

3. The method of claim 2, wherein said mean is computed according to:

$$\mu = \frac{1}{N_{3D}}\sum_{j=1}^{N_{3D}}\gamma_j$$

where
    $\gamma_j$ is a persistency factor;
    $\mu$ is the mean of said persistency factor; and
    $N_{3D}$ is the number of 3D points.

4. The method of claim 3, wherein said error function is computed according to $$\min_{R_i,t_i,X_j}\sum_{i=1}^{N_c}\sum_{j=1}^{N_{3D}}\left(\frac{\gamma_j}{\mu+\sigma}\right)^2\log\left(1+\left(\frac{\mu+\sigma}{\gamma_j}\right)^2\|x_{ji} - g(X_j, R_i, t_i, K_i)\|^2\right)$$

where
    $R_i$ is a rotation matrix of an ith camera;
    $t_i$ is a translation vector of an ith camera;
    $K_i$ is a calibration matrix of an ith camera;
    $X_j$ is a 3D point from said image;
    $x_{ji}$ is an image coordinate in an ith camera
    $g(X_j, R_i, t_i, K_i)$ is a projection model mapping of $X_j$ onto an image plane of an ith camera;
    $\sigma$ is the standard deviation of the lengths of all said feature tracks; and
    $N_C$ is a number of cameras.

5. The method of claim 4, wherein said bundle adjustment is computed according to:

$$\min_{R_i,t_i,X_j}\sum_{i=1}^{N_c}\sum_{j=1}^{N_{3D}}\|x_{ji} - g(X_j, R_i, t_i, K_i)\|^2.$$

6. The method of claim 5 wherein weighting residuals is computed according to:

$$\left(\frac{\gamma_j}{\mu+\sigma}\right)^2\log\left(1+\left(\frac{\mu+\sigma}{\gamma_j}\right)^2 s_j^2\right)$$

where
    $s_j^2$ is a residual of a jth 3D point in an ith camera, represented by:

$$s_j^2 = \|x_{ji} - g(X_j, R_i, t_i, K_i)\|^2.$$

7. An article of manufacture comprising a non-transitory storage medium and a plurality of programming instructions stored therein, wherein said programming instructions are configured to implement upon a camera system for three dimensional image reconstruction, the following actions:
    the acquisition of camera metadata, said metadata comprising camera position metadata and camera orientation metadata;
    the extraction of interest points from each said image frame in said sequence;
    the comparison of descriptors of said extracted interest points for each two successive image frames;
    the matching of said descriptors so as to generate feature tracks;
    the generation of a persistency factor for each said feature track as a function of said feature track's length;

the computation of a set of statistics for all said persistency factors when all feature tracks have been generated;

the computation of a triangulation based on said camera metadata and said feature tracks so as to generate estimated initial 3D interest points of said image;

the weighting of residuals generated from back projection error using said persistency factors;

the computation of an error function incorporating said weighted residuals, so as to reduce the effect of outlier noise; and the computation of a bundle adjustment incorporating said weighted residuals and said camera metadata, so as to optimize said camera pose refinement and said estimated initial 3D interest points.

8. The article of manufacture of claim 7, wherein said set of statistics further comprises mean and standard deviation.

9. The article of manufacture of claim 8, wherein said mean is computed according to:

$$\mu = \frac{1}{N_{3D}} \sum_{j=1}^{N_{3D}} \gamma_j$$

where $\gamma_j$ is a persistency factor;

$\mu$ is the mean of said persistency factor; and $N_{3D}$ is the number of 3D points.

10. The article of manufacture of claim 9, wherein said error function is computed according to $$\min_{R_i,t_i,X_j} \sum_{i=1}^{N_c} \sum_{j=1}^{N_{3D}} \left(\frac{\gamma_j}{\mu+\sigma}\right)^2 \log\left(1 + \left(\frac{\mu+\sigma}{\gamma_j}\right)^2 \|x_{ji} - g(X_j, R_i, t_i, K_i)\|^2\right)$$

where $R_i$ is a rotation matrix of an ith camera;

$t_i$ is a translation vector of an ith camera;

$K_i$ is a calibration matrix of an ith camera;

$X_j$ is a 3D point from said image;

$x_{ji}$ is an image coordinate in an ith camera $g(X_j, R_i, t_i, K_i)$ is a projection model mapping of $X_j$ onto an image plane of an ith camera;

$\sigma$ is the standard deviation of the lengths of all said feature tracks; and $N_C$ is a number of cameras.

11. The article of manufacture of claim 10, wherein said bundle adjustment is computed according to:

$$\min_{R_i,t_i,X_j} \sum_{i=1}^{N_c} \sum_{j=1}^{N_{3D}} \|x_{ji} - g(X_j, R_i, t_i, K_i)\|^2.$$

12. The article of manufacture of claim 11 wherein weighting residuals is computed according to:

$$\left(\frac{\gamma_j}{\mu+\sigma}\right)^2 \log\left(1 + \left(\frac{\mu+\sigma}{\gamma_j}\right)^2 s_j^2\right)$$

where $s_j^2$ is a residual of a jth 3D point in an ith camera, represented by:

$$s_j^2 = \|x_{ji} - g(X_j, R_i, t_i, K_i)\|^2.$$

\* \* \* \* \*